Dec. 18, 1934.  U. BARSKE  1,984,958
INDIVIDUAL TWO- OR MULTI-STAGE AXLE DRIVE FOR
RAIL VEHICLES WITH FOTTINGER GEARS
Filed Dec. 21, 1933

Patented Dec. 18, 1934

1,984,958

UNITED STATES PATENT OFFICE

1,984,958

INDIVIDUAL TWO- OR MULTI-STAGE AXLE DRIVE FOR RAIL VEHICLES WITH FÖTTINGER GEARS

Ulrich Barske, Hanover, Germany, assignor to Franz Kruckenberg and Curt Stedefeld, Hanover, Germany Application December 21, 1933, Serial No. 703,472
In Germany December 24, 1932

2 Claims. (Cl. 105—109)

The invention relates to rail vehicles with two or more axles individually driven, the source of power used being an internal-combustion engine. The power is transmitted from the engine to the axles through the intermediary of hydraulic Föttinger transmission gears which are disposed directly on the driven axles. It is a well-known fact that these gears have the valuable property of automatically and steadily changing the invariable torque of the driving engine. In the case of substantially varying running conditions however the simple guide wheel gear is no more sufficient and there must be employed several liquid circuits each of which is intended for a definite range of speeds. The several speeds are then put in and out respectively by the particular circuits being filled and emptied.

With a given power of the driving engine the tractive effort obtainable at the periphery of the wheels is, as is well-known, dependent on the running speed, viz. approximately inversely proportional to the same. The present invention is based on the idea that actually all driving axles are required for the utilization of the high tractive efforts available at low running speeds but that at higher running speeds the number of driving axles can be reduced, since also the tractive efforts decrease. According to the invention this idea is realized by a suitable distribution of the speed stages, viz. of the liquid circuits, in such a way that all driving axles are provided with the stage corresponding to the lowest running speed, that is to the highest tractive effort. The other speed stages are however reduced in number about in the same measure as a smaller number of driving axles or groups of axles are required at the higher running speeds, viz. corresponding to lower tractive efforts. Nevertheless these circuits are so designed that they are able to take up the total output of the common source of energy, which is possible by a rather slight enlargement of the diameter of the circuits, the energy taken up increasing at the fifth power of the said diameter.

In contrast to the usual arrangement in which each driven axle or group of axles is provided with the same gear comprising all speed stages, the new design of the driving set, as constructed according to the present invention, results in a sensible economy in structural members, space and weight.

In the representation of the embodiments shown by Figs. 1 to 3, all constructional details unessential to the present invention have been omitted and the gears etc. have been replaced by diagrammatic symbols generally understood.

Figure 1:
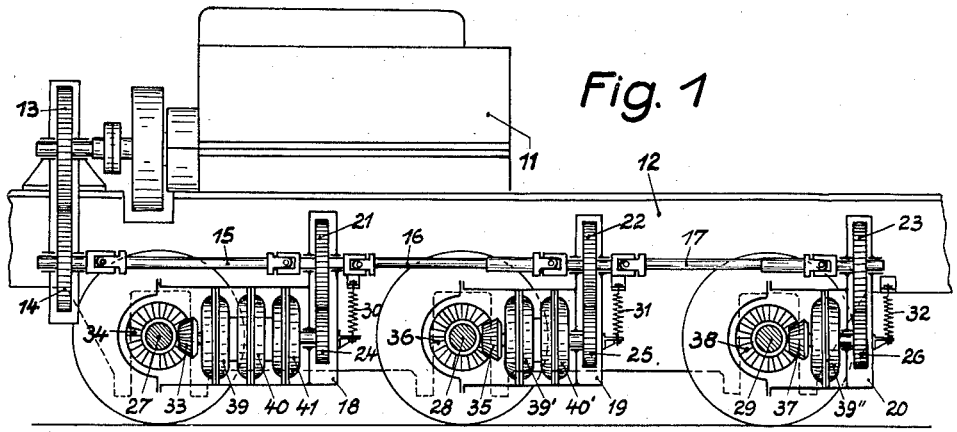
Fig. 1 is a partial longitudinal section of a rail vehicle the three driving axles of which are provided with Föttinger gears constructed in accordance with the invention.

In the embodiment shown by Fig. 1 the driving engine 11 is mounted on the vehicle frame 12 and through the intermediary of the pair of spur gears 13—14 and the cardan shafts 15, 16 and 17 it drives the spur wheels 21, 22 and 23 mounted in the gear housings 18, 19 and 20. These spur wheels mesh with the spur wheels 24, 25 and 26 of the hydraulic transmission gears. The gear housings 18, 19 and 20 are, in a well-known manner, on the one hand mounted on the respective axles 27, 28 and 29 and on the other hand yieldingly suspended within the frame 12 by means of springs 30, 31 and 32. The said axles 27, 28 and 29 are driven by the hydraulic transmission gears through bevel gears disposed on the well-known bevel-wheel reversing gear system so that also the reversal is accomplished by means of them (see also Fig. 3). The reversing members otherwise per se known have been omitted in the drawing for simplicity and only the pairs of bevel gears 33—34, 35—36 and 37—38 have been represented.

Now the hydraulic transmission gears are so constructed that the three driving axles 27, 28 and 29 are each provided with a circuit 39, 39' and 39'' respectively for the first speed. These liquid circuits are thus filled e. g. for the start or on heavy up-grades. The running speed having increased so much that the second speed must be put in, the tractive effort required will have decreased so much that less than three driving axles will suffice for running. Therefore the two axles 27 and 28 only are provided with the corresponding circuits 40 and 40' respectively. When eventually the third speed is put in at high running speed, one axle will be sufficient for the transmission of the tractive effort correspondingly reduced, and so the axle 27 only is provided with the circuit 41 of the third speed stage. Fig. 1 evidences the simplification of the whole set as obtained by the disposition of the speed stages according to the invention in comparison with the usual arrangement in which all driving axles are provided with identical transmission gears in the present instance.

The internal design of the Föttinger gears is without importance for the present inventive idea. All speed stages may e. g. be designed as torque increasing transformers with fixed guide blades. The third speed stage, that is the circuit 41 of the axle 27, will however often be designed as a hydraulic coupling without guide blades. The circuits 39 and 39' as well as 40 and 40' of the axles 27 and 28 respectively could further be e. g. combined so as to form a single circuit 39 and 40 respectively provided with adjustable blades. With one position of the blades they would cooperate in the first speed with the circuit 39'' of the axle 29 and after the circuit 39'' having been emptied and the position of the blades changed, they would work as the second speed stage.

Figure 2:
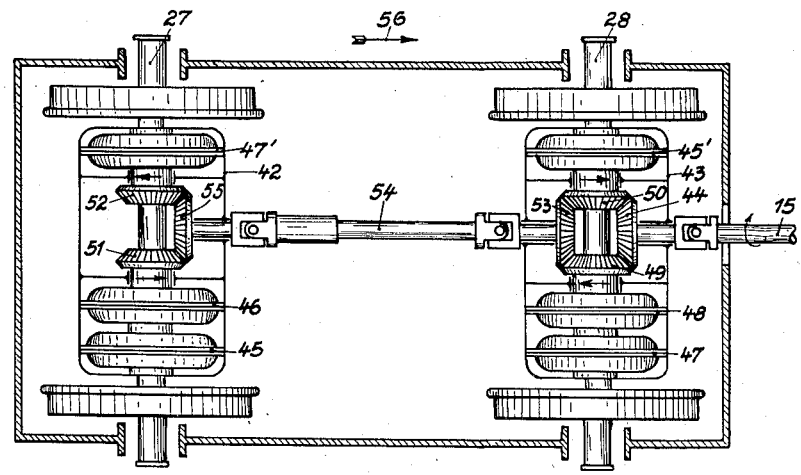
Fig. 2 shows the top plan view of two driving axles provided with Föttinger gears disposed in another way, and Fig. 3 also shows a top plan view of the underframe of another vehicle which is not provided with two single axles but with two axle groups each belonging to a truck and provided with transmission gears constructed according to the invention.

In contrast to Fig. 1 just described, the gear housings 42 and 43 of Fig. 2 are directly mounted on the axles 27 and 28 so as to enclose the latter, the same as the liquid circuits 45, 46, 47' and 47, 48 and 45' housed within the said housings. The primary shafts (not shown in Fig. 2) of the hydraulic transmission gears are hollow shafts concentrically enclosing the axles 27 and 28 in a well-known way and carrying bevel wheels 49, 50, 51 and 52 respectively. The bevel wheel 44 mounted in the housing 43 is supposed to be driven by the engine through a cardan shaft 15, the same as in Fig. 1, in which case the running directions of the bevel wheels 49 and 50 are always opposed. By a further bevel wheel 53, cardan shaft 54 and bevel wheel 55 the power is transmitted to the hydraulic transmission gears of axle 27, in which case also the running directions of the bevel wheels 51 and 52 are opposed. With this arrangement the primary shafts of the hydraulic transmission gears 45, 46 and 45' are caused to rotate in the same direction and the running direction of the vehicle will result as shown by arrow 56. Inversely the hydraulic transmission gears 47, 48 and 47' work in the opposite running direction of the vehicle. The several speed stages are again distributed over the two axles according to the invention. When the vehicle moves in the direction of the arrow 56, the liquid circuits 45 and 45' form the first speed stage while at higher running speeds the axle 27 only acts as a driving axle through the intermediary of the stage 46. In case the vehicle moves in the opposite direction the circuits 47 and 47' represent the first speed stage and the circuit 48 the second speed stage.

In contrast to Fig. 1 the reversal is thus in this instance accomplished hydraulically only, which results in the well-known advantage of minimum wear and maximum safety. Moreover it is possible to brake the vehicle hydraulically by such a reversal from full speed.

The transmission gears need not be disposed on the axles as shown in the drawing but may be mounted on a shaft each parallel to the particular axle which is thus driven by the associate axle by means of a pair of spur wheels.

Instead of a single axle each transmission gear above described could also drive a group comprising two or more driving axles, the axles of a particular group being coupled with one another by suitable means.

Figure 3:
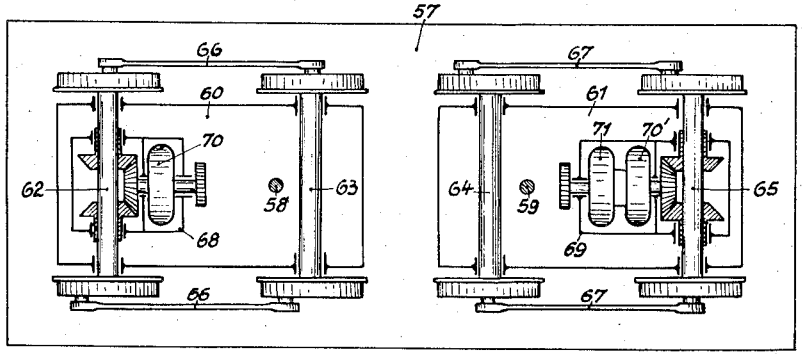

The embodiment shown by Fig. 3 in this connection is e. g. a Diesel locomotive constructed to afford a particularly good flexibility in curves. The vehicle frame 57 is provided with two truck frames 60 and 61 pivoted by means of the center pins 58 and 59, in which frames two pairs of driving axles 62 and 63, 64 and 65 respectively are mounted. The driving axles of either truck are in the well-known manner coupled by means of coupling rods 66 and 67. The two groups of axles so formed are each driven by a hydraulic transmission gear 68 and 69 respectively which are, exactly as in the embodiment shown by Fig. 1, suspended from the axles 62 and 65 repectively in the same way as tramway motors. The construction of these gears and of their driving means also corresponds to that of the identical members belonging to the axle 28 and 29 of Fig. 1. According to the invention either group of axles is provided with a liquid circuit 70 and 70' forming the first speed stage. The circuit 71 of the second speed stage however is disposed at axle 65 only so that at higher speeds only the axle group 64—65 is a driving one.

In other instances the distribution of the speed stages may naturally be modified as compared with the embodiments shown. In case the three driving axles of Fig. 1 are to be actuated e. g. on two stages, all three axles would be equipped again with the circuits 39, 39' and 39'' of the first speed stage. According to the amount of tractive effort required the second speed stage (40) would be applied to one axle (27) only or to two axles (27 and 28).

When more axles or axle groups than shown in the embodiments referred to are available, the distribution of the speed stages should be done according to the spirit of the present invention.

A vehicle could also be equipped with two or more engines which are adapted to act together on the driving axles in the way described, or each engine would be associated with its particular driving axles the driving sets of which are constructed again in accordance with the present invention.

I claim:

1. In a rail vehicle driven by an internal combustion engine, a plurality of driving axles, multi-stage transmission gears distributed to the driving axles, and means adapted to transmit the power to the transmission gears the speed stages of which consist in hydraulic Föttinger transmission gears, all driving axles associated with one source of power being provided with the speed stage corresponding to the lowest running speed while the number of axles provided with the further speed stages is reduced in the same measure as a smaller number of driven axles is required on account of the higher running speeds and lower tractive efforts.

2. In a rail vehicle driven by an internal combustion engine, a plurality of driving axles divided into several groups each of which comprises several axles coupled with one another, multi-stage transmission gears distributed to the driving axle groups and means adapted to transmit the power to the transmission gears the speed stages of which consist in hydraulic Föttinger transmission gears, all groups of driving axles associated with one source of power being provided with the speed stage corresponding to the lowest running speed while the number of axle groups provided with the further speed stages is reduced in the same measure as a smaller number of driven axle groups is required on account of the higher running speeds and lower tractive efforts.

ULRICH BARSKE.